United States Patent [19]

Kolobow

[11] 4,093,515

[45] June 6, 1978

[54] LAMINATED CARBON-CONTAINING SILICONE RUBBER MEMBRANE FOR USE IN MEMBRANE ARTIFICIAL LUNG

[75] Inventor: Theodor Kolobow, Rockville, Md.

[73] Assignee: Government of the United States, Washington, D.C.

[21] Appl. No.: 663,127

[22] Filed: Mar. 1, 1976

[51] Int. Cl.² ............................................. B01D 13/00
[52] U.S. Cl. ............................... 195/1.8; 23/258.5 M; 210/321 B
[58] Field of Search ...................... 210/22, 502, 321 B; 23/258.5; 428/447; 195/1.8; 55/16, 158

[56] References Cited

U.S. PATENT DOCUMENTS

| 3,252,270 | 5/1966 | Pall et al. | 210/502 UX |
| 3,510,387 | 5/1970 | Robb | 428/447 X |

OTHER PUBLICATIONS

Kolobow et al., "Superior Blood - - - in the Membrane Lung," from vol. XX, Trans. Amer. Soc. Artif. Int. Organs, 1974, pp. 269-279.
Gott et al., "Techniques of Applying - - - Plastics and Metals," from vol. X, Trans. Amer. Soc. Artif. Int. Organs, 1964, pp. 213-217.

*Primary Examiner*—Frank A. Spear, Jr.
*Attorney, Agent, or Firm*—Holman & Stern

[57] ABSTRACT

A blood-compatible gas-permeable laminated carbon-containing silicone rubber membrane for use in a membrane artificial lung. The membrane is composed of at least two layers wherein the first layer is of silicone rubber compounded with silica filler and the second layer is of silicone rubber compounded with carbon black filler. The second layer may be sandwiched between the first layer and a third layer of either silicone rubber compounded with silica filler or filler-free silicone rubber. Utilizing such membrane for extracorporeal blood gas exchange in a membrane artifical lung results in elimination of thrombosis without the necessity for maintenance anticoagulant treatment during perfursion, and enables elimination of leukopenia and granulocytopenia or inhibition of blood platelet count decreases during perfusion.

19 Claims, 4 Drawing Figures

LAMINATED CARBON-CONTAINING SILICONE RUBBER MEMBRANE FOR USE IN MEMBRANE ARTIFICIAL LUNG

BACKGROUND OF THE INVENTION

This invention relates to silicone rubber membranes and, more particularly, to blood-compatible gas-permeable silicone rubber membranes for use in a membrane artificial lung.

Clinical use of membrane artificial lungs for extracorporeal blood gas exchange has been known since 1956. Largely due to the fact that the early versions of the membrane artificial lung were both cumbersome and unreliable, bubble or disc oxygenators gained a wider clinical acceptance. However, experience has indicated that membrane artificial lungs are potentially more suitable in extended applications, as for prolonged respiratory assistance, since they avoid the blood-gas interface associated with bubble or disc oxygenators and its attendant complications. For example, fat emboli, microembolic insults, and damage to blood proteins and lipoproteins appear to be the result of prolonged perfusion using blood-gas interface oxygenator systems, and up to the present time there has been no report of clinical or laboratory use of bubble or disc oxygenators beyond 24 hours with survival. With membrane artificial lungs, on the other hand, there have been reports of long-term (up to 2 weeks) animal perfusions and a number of long-term (up to 10 days) extracorporeal perfusions in man. Furthermore, evidence continues to accumulate showing the superiority of the membrane artificial lung over bubble or disc oxygenators even in short-term open heart surgery.

Despite these optimistic reports and continued improvement in membrane artificial lung design, certain problem areas still remain standing in the way of wider clinical acceptance of the membrane artificial lung. Most of these problems appear to be associated with the material constituting the membrane through which the blood gas exchange is effected. Such membrane must have the proper combination of blood compatibility, gas permeability, and tensile and tear strength, in order for the membrane artificial lung to be reliably effective. The most acceptable material thus far found for this purpose has been silicone rubber, which, when compounded with silica filler to increase tensile strength, can be cast into a thin membrane having excellent gas transfer properties, adequate strength, and at least a comparatively acceptable degree of blood compatibility. However, the blood compatibility of such membrane still leaves much to be desired, since the use of such membrane in a membrane artificial lung device necessitates maintenance anticoagulant treatment, for example, with heparin, during the perfusion in order to prevent thrombosis from occuring within the device, which treatment must be finely balanced in order to also avoid bleeding. Moreover, in addition to the clotting problem, this membrane also produces other adverse effects on the blood being perfused, such as transient leukopenia and severe granulocytopenia during initial minutes of perfusion, as well as a decrease in blood platelet count during perfusion, the mechanism and means of prevention of these effects as yet being unknown.

Although it has been speculated that the incorporation of silica filler in the above-described silicone rubber membrane may detract from the inherent blood compatibility of the silicone rubber, filler-free silicone rubber has a very low tensile strength and would not by itself have the required strength for use in the membrane artificial lung. Moreover, other fillers commonly employed with silicone rubber, such as, for example, carbon black, would not impart sufficient strength to silicone rubber membranes sufficiently thin to have the required gas permeability for use in the membrane artificial lung.

A previous attempt by the present inventor and coworkers to improve the blood compatibility of silicone rubber membranes, described in Trans. Amer. Soc. Artif. Intern. Organs, Volume 20A, Pages 269–276, 1974, involved the utilization of a double layer casting technique to make a composite membrane in which the first layer consisted of silicone rubber compounded with silica filler and the second layer, forming the blood-contacting surface, consisted of filler-free silicone rubber. When tested in a membrane artificial lung device, this composite membrane exhibited a somewhat higher degree of blood compatibility as compared with the single-layer silica-filled silicone rubber membrane, but still required maintenance anticoagulant treatment during perfusion in order to prevent thrombosis from occurring within the device, and still produced transient leokopenia and granulocytopenia during the initial minutes of perfusion. Thus, while the composite membrane required only one-half the heparin dose normally required with the single-layer silica-filled silicone rubber membrane, when no maintenance heparin treatment was administered clot formation began to occur with the composite membrane after approximately 18 hours of perfusion and progressed with time. In regard to blood platelet count, with no maintenance heparin treatment being administered during perfusion, the composite membrane produced no significant decrease at the initiation of perfusion, a decrease to 85% of baseline values after 6 hours of perfusion, and a decrease to 50% of baseline values after 18 hours of perfusion, in comparison with the single-layer silica-filled silicone rubber membrane which produced a decrease to 75% of baseline values after 5 minutes of perfusion, a decrease to 50% of baseline values after 30 minutes of perfusion, and a decrease to 25% of baseline values after 18 hours of perfusion. Thus, it can be seen that while this previously proposed composite silicone rubber membrane is somewhat more blood compatible than the single-layer silica-filled silicone rubber membrane, it still presents many of the same problems and leaves substantial room for improvement.

SUMMARY OF THE INVENTION

It is accordingly a primary object of the present invention to provide improvements in membrane artificial lung devices so as to enable their use for extracorporeal blood gas exchange by blood perfusion therethrough with the elimination or reduction of many of the problems previously encountered therewith.

Another object of this invention is to provide a silicone rubber membrane having sufficient gas permeability and strength for use in membrane artificial lung devices, and having improved blood compatibility in comparison with membranes previously used for this purpose.

A further object of this invention is to provide a blood-compatible gas-permeable silicone rubber membrane in accordance with the preceding object, which enables elimination of thrombosis within the membrane artificial lung device without the necessity for maintenance anticoagulant treatment during perfusion.

Still another object of this invention is to provide a blood-compatible gas-permeable silicone rubber membrane in accordance with the preceding object, which enables elimination of leukopenia and granulocytopenia during perfusion.

A still further object of the present invention is to provide a blood-compatible gas-permeable silicone rubber membrane in accordance with the penultimate preceding object, which enables improved inhibition of decreases in blood platelet count during perfusion.

The above and other objects are achieved in accordance with the present invention by providing a laminated carbon-containing silicone rubber membrane composed of at least two layers wherein the first layer is silicone rubber compounded with silica filler and the second layer is of silicone rubber compounded with carbon black filler. The second layer may be sandwiched between the first layer and a third layer of either silicone rubber compounded with silica filler or filler-free silicone rubber. Such membrane can be readily fabricated by successive layer casting technique in thicknesses such that the membrane will have both sufficient strength and sufficient gas permeability so as to be suitable for use for extracorporeal blood gas exchange in a membrane artificial lung device. The presence of the carbon-containing layer provides the membrane with a significantly higher degree of blood compatibility such that the use of the membrane in a membrane artificial lung device results in elimination of thrombosis within the device without the necessity for maintenance anticoagulant treatment during perfusion. Furthermore, depending upon the presence and nature of the third layer, the improved blood compatibility imparted to the membrane by the carbon-containing layer enables elimination or improved inhibition of the adverse effects of the membrane on white blood cells, granulocytes and blood platelets. Thus, employing a membrane in accordance with the present invention having no third layer at all or having a third layer consisting of silicone rubber compounded with silica filler results in elimination of leukopenia and granulocytopenia during perfusion. On the other hand, employing a membrane in accordance with the present invention having a third layer consisting of filler-free silicone rubber results in improved inhibition of blood platelet count decreases during perfusion.

DESCRIPTION OF THE DRAWINGS

The present invention and the advantages thereof will be further understood and appreciated from the following detailed description of preferred embodiments of the invention which are illustrated in the accompanying drawings, in which.

DESCRIPTION OF PREFERRED EMBODIMENTS

Figure 1:
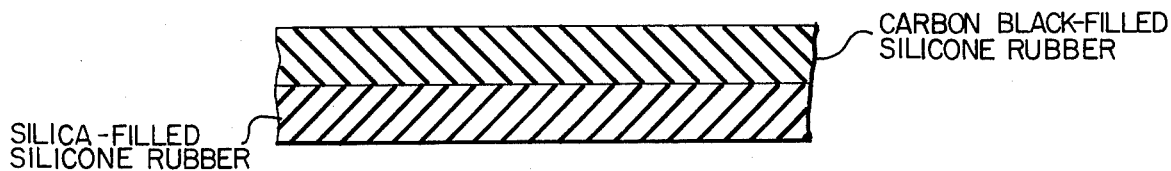
FIG. 1 is an elevational cross-sectional view of a first embodiment of a laminated silicone rubber membrane in accordance with the present invention, composed of two layers.

The laminated carbon-containing silicone rubber membranes in accordance with the present invention are composed of at least two discrete layers of silicone rubber material, at least one of which is silicone rubber compounded with silica filler, and at least one of which is silicone rubber compounded with carbon black filler. The silicone rubbers suitable for use in the present invention are well-known polymeric materials of units of the average formula

$$R_n SiO_{(4-n)/2}$$

wherein each R is a monovalent hydrocarbon radical or a halogenated monovalent hydrocarbon radical and $n$ has a value of 1.9 to 2.1 and preferably 1.99 to 2.01. In the above formula, R can be any monovalent hydrocarbon radical including alkyl radicals such as methyl, ethyl and octadecyl; aryl radicals such as phenyl and anthracyl; alkaryl radicals such as tolyl, xylyl and methylnaphthyl; aralkyl radicals such as benzyl and phenylethyl; cycloaliphatic radicals such as cyclopropyl and cyclopentyl; and alkenyl radicals such as vinyl, alkyl and octadecenyl. R can also represent any halogenated derivatives of the foregoing listed monovalent hydrocarbon radicals including chloromethyl, bromophenyl, iodotolyl, perchlorophenylethyl, perchlorovinyl, chlorofluorovinyl, 3,3,3-trifluoropropyl, and so forth. The radicals represented by R can be all the same or they can be different. The operative polymers can be homopolymers such as polymers made up entirely of dimethylsiloxane units or of methylvinylsiloxane units, or they can be copolymers of various units such as methylvinylsiloxane units and dimethylsiloxane units. Although any of the above-described silicone rubbers may suitably be used in making the membranes of the present invention, the preferred silicone rubber in terms of performance in membrane artificial lung use is polydimethylsiloxane.

The filler-containing silicone rubber stocks used in forming the individual layers of the laminated membrane of the present invention are prepared by compounding the silicone rubber with the appropriate filler in a manner well known in the art. The amounts of filler incorporated into the silicone rubber stock may be varied within rather wide limits. In regard to the silica-filled stock, the amount of silica employed should be sufficient to impart to the final membrane sufficient tensile strength so as to be useful in membrane artificial lung devices. For example, commercially available silica-filled silicone rubber stocks containing from about 25 to about 40 percent by weight of silica filler have been found to be suitable for this purpose.

In regard to the carbon black-filled silicone rubber stock, while any carbon black filler can suitably be employed, the preferred filler material is acetylene carbon black due to its relatively high degree of purity. The amount carbon black filler employed in the stock may suitably vary within the range of from about 0.25 to about 40 percent by weight, and preferably within the range of from about 15 to about 30 percent by weight for optimum results in membrane artificial lung applications. A particularly suitable carbon black-filled silicone rubber stock for this purpose has been found to be a polydimethylsiloxane silicone rubber containing about 25 percent by weigh of acetylene carbon black.

Fabrication of the laminated membrane is suitably effected by a successive layer casting technique wherein organic solvent dispersions of each of the silicone rubber stocks being employed in the membrane are successively cast one on top of the other. In preparing the silicone rubber stock dispersions, any suitable organic solvent can be employed, such as aliphatic or aromatic hydrocarbons, non-flammable chlorinated solvents, and the like. The particular solvent employed is not material, although toluene has been found to be particularly suitable since it has a high solubility for organic peroxide curing catylysts and avoids bleeding of the catalyst to the film surface during solvent evaporation. The rubber concentration within the dispersion may vary within wide limits, and is typically within the range of from about 10 to 25 percent. The dispersion also generally includes a curing catalyst, such as, for example, benzoyl peroxide, 2,4-dichlorobenzoyl peroxide, tertiary butyl perbenzoate, and the like, in an amount ranging from about 0.1 to 8 percent, preferably 1.5 to 3.5 percent, by weight, based on the weight of the silicone rubber, for curing the silicone rubber to the solid, elastic state.

The first layer of the membrane is formed by casting a film of the silica-filled silicone rubber stock dispersion onto a suitable releasable carrier substrate, such as, for example, pure aluminum foil, polished SS304 stainless steel foil, a fluorocarbon material such as polyfluoroethylenepropylene or polytetrafluoroethylene, polyester film, preferably aluminized or treated with a release agent, or the like. The film is then heated, for example, to temperatures around 100° C, to evaporate the solvent from the film and partially cure the film. The second layer of the membrane is then formed by casting the carbon black-filled silicone rubber stock dispersion on top of the first layer. If the final membrane is to be composed of only these first and second layers, the solvent in the second layer is then evaporated by heating to temperatures of, for example, 70° to 80° C, after which the entire membrane is fully cured by heating to curing temperatures of, for example, from about 180° to about 200° C. The membrane may thereafter be post-cured with ultraviolet radiation which significantly increases the tensile strength and burst strength and decreases the elongation of the membrane.

When the membrane is to be composed of more than two layers, the above-described complete curing of the membrane is postponed until after all the layers have been cast, and in addition, the solvent evaporation step following casting of the second and each succeeding non-final layer may be dispensed with. The third layer would thus be formed by casting either a silica-filled silicone rubber stock dispersion or a filler-free silicone rubber stock dispersion on top of the second layer immediately after the latter has been cast. More than three layers can be cast in this way. Following casting of the final layer, solvent evaporation, curing and post-curing are carried out as above.

The membrane is preferably provided with a gas-permeable reinforcing material embedded therein. Suitable reinforcing materials include woven, knitted or non-woven fabric, such as unsized polyamide, polyester or fiberglass fabric, and microporous polymeric film, such as microporous polypropylene or polytetrafluoroethylene film. The reinforcing material serves to strengthen the physical properties of the membrane and make it easier to handle. Moreover, in membrane artificial lung application, surface roughness of the reinforcing material can augment blood mixing within the membrane lung and thereby contribute to a significant increase in membrane lung gas transfer. Also, in some membrane lungs blood spacing is provided by the reinforcing material as part of the membrane, and is thereby a factor in membrane lung design. The reinforcing material may be conveniently embedded within one of the layers of the membrane, preferably within the second layer, for example, by feeding the reinforcing material underneath the doctor blade used for casting the layer.

Figure 2:
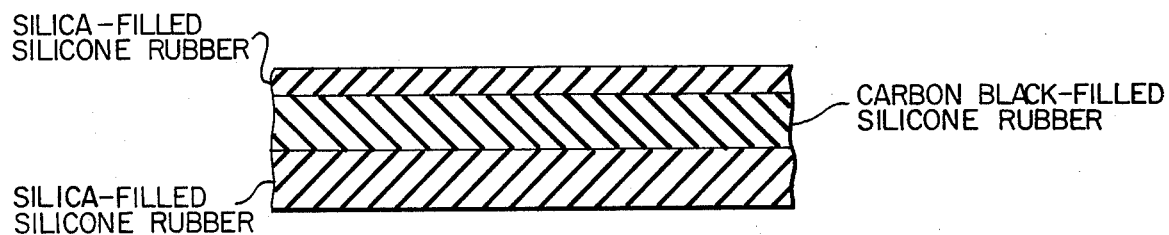
FIG. 2 is an elevational cross-sectional view of a second embodiment of a laminated silicone rubber membrane in accordance with the present invention, composed of three layers.

The laminated membrane produced by the above-described successive layer casting technique exhibits excellent bonding between its adjacent layers. When fabricated in this manner so that the first layer has a thickness of from about 5 to about 100 microns and each additional layer has a thickness of from about 1 to about 100 microns, with the membrane having a total thickness of from about 20 to about 250 microns, the resulting membrane has sufficient strength and sufficient gas permeability for membrane artificial lung application. An optimum balance of these two properties is generally obtained at a total membrane thickness of about 50 microns. In the two-layer embodiment shown in FIG. 1, composed of a first layer silica-filled silicone rubber and a second layer of carbon black-filled silicone rubber, each layer preferably has a thickness of about 25 microns. In the three-layer embodiment shown in FIG. 2, composed of a first layer of silica-filled silicone rubber, a second layer of carbon black-filled silicone rubber and a third layer of silica-filled silicone rubber, and in the three-layer embodiment shown in FIG. 3, composed of a first layer of silica-filled silicone rubber, a second layer of carbon black-filled silicone rubber and a third layer of filler-free silicone rubber, each of the first and second layers preferably has a thickness of about 20 microns and the third layer preferably has a thickness of about 10 microns. In the embodiment of FIG. 2, the first and third layers may both conveniently be formed from the same silica-filled silicone rubber stock preferably containing from about 25 to about 40 percent by weight of the silica filler.

Figure 4:
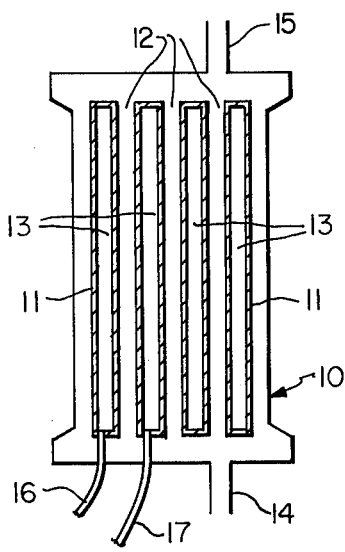
FIG. 4 is an elevational cross-sectional view of a membrane artificial lung, showing the use therein of the laminated silicone rubber membrane of the present invention.

The laminated carbon-containing silicone rubber membranes of the present invention are utilized as the blood gas exchange membrane in membrane artificial lung devices as illustrated in FIG. 4, which shows a conventionally designed spiral coil membrane lung 10 having a blood gas exchange membrane 11 forming the interface between the blood compartment 12 and a gas compartment 13. The membrane lung is provided with a blood inlet 14 leading into the blood compartment, a blood outlet 15 leading out from the blood compartment, an oxygenating gas inlet 16 leading into the gas compartment, and a waste gas outlet 17 leading out from the gas compartment.

Figure 3:
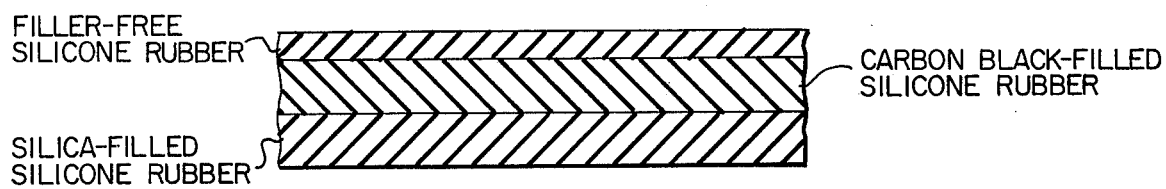
FIG. 3 is an elevational cross-sectional view of a third embodiment of a laminated silicone rubber membrane in accordance with the present invention, also composed of three layers.

When utilizing the laminated carbon-containing silicone rubber membranes of the present invention as the blood gas exchange membrane 11 in such membrane artificial lung devices, optimum perfusion results are obtained when the membrane is disposed within the device in a manner such that the membrane layer which was the last to be cast during fabrication of the membrane forms the inner wall of the blood compartment 12 and thus constitutes the blood-contacting surface during blood perfusion through the device. Thus, assuming that in each of the preferred embodiments of the present invention as illustrated in FIGS. 1-3, the lowermost layer was the first to be cast and the uppermost layer was the last to be cast during fabrication of the membrane, it is preferred that the blood-contacting surface of the membrane be the carbon black-filled silicone rubber layer when employing the two-layer membrane shown in FIG. 1, the uppermost silica-filled silicone rubber layer when employing the three-layer membrane shown in FIG. 2, and the filler-free silicone rubber layer when employing the three-layer membrane shown in FIG. 3.

When carrying out extracorporeal blood gas exchange in known manner by blood perfusion through a membrane artificial lung device including the laminated carbon-containing silicone rubber membranes of the present invention as the blood gas exchange membrane, the presence of the carbon-containing layer in the membrane provides the membrane with a significantly higher degree of blood compatibility such that thrombosis within the device is eliminated, during both short- and long-term perfusion, without the necessity for maintenance anticoagulant treatment during such perfusion. Furthermore, depending upon the particular embodiment of the membrane employed, the improved blood compatibility imparted to the membrane by the carbon-containing layer enables elimination or improved inhibition of the adverse effects of the membrane on white blood cells, granulocytes and blood platelets. Thus, employing the two-layer membrane shown in FIG. 1 or the three-layer membrane shown in FIG. 2, results in elimination of leukopenia and granulocytopenia during the perfusion. On the other hand, employing the three-layer membrane shown in FIG. 3 results in improved inhibition of blood platelet count decreases during the perfusion, to the extent that blood platelet counts will remain at baseline values at initiation of perfusion and will decrease to a minimum of approximately 80 percent of baseline values even after long-term perfusions of close to two weeks duration.

Neither the mechanism involved nor the reason why the laminated carbon-containing silicone rubber membranes of the present invention exhibit such superior blood compatibility properties, is completely understood. Although carbon black fillers have previously been incorporated into various polymeric materials, including silicone rubbers, for imparting electrical conductivity to the polymeric material, and although it is true that the uppermost surface of the two-layer membrane shown in FIG. 1 will be electrically conductive, electrical conductivity of the membrane surface apparently has little to do with the superior blood compatibility properties exhibited by the membranes of the present invention, since such superior properties are likewise exhibited by the three-layer membranes shown in FIGS. 2 and 3, whose surfaces are electrically insulating and not conductive. Moreover, the improved effects achieved are even more pronounced with the three-layer membranes shown in FIGS. 2 and 3 than with the two-layer membrane shown in FIG. 1, apparently due to the fact that the carbon-containing layer generally has a somewhat granular surface with crevices which would tend to interfere with smooth blood flow during perfusion and increase the likelihood of clot formation. When the carbon-containing layer is covered with the third layer, as in the membranes shown in FIGS. 2 and 3, the blood-contacting surface is more planar and thus more conductive to smoother blood flow during perfusion.

The invention is further illustrated by way of the following Examples.

EXAMPLE 1

A 20 percent dispersion in toluene of commercial silica-filled silicone rubber stock containing 25 to 40 percent by weight of the silica filler, and further containing 1.5 percent by weight of 2,4-dichlorobenzoyl peroxide, was cast under a doctor blade onto a continuous strip of aluminum foil moving at the rate of 1 to 2 feet per minute. The film was then heated to a temperature of 100° C to evaporate the solvent from the film and partially cure the film. A 15 percent dispersion in toluene of silicone rubber containing 25 percent by weight of acetylene carbon black filler, and further containing 3.5 percent by weight of benzoyl peroxide, was then cast by a second doctor blade on top of the partially cured film of silica-filled silicone rubber. The membrane was then heated to a temperature of 70° C to evaporate the solvent from the second layer, after which the entire membrane was fully cured by heating to a curing temperature of 180° C. The membrane was thereafter post-cured with ultraviolet light.

The resulting two-layer laminated silicone rubber membrane had the configuration as shown in FIG. 1. The membrane had a total thickness of 50 microns, with each of the two layers having a thickness of 25 microns.

EXAMPLE 2

A 20 percent dispersion in toluene of commercial silica-filled silicone rubber stock containing 25 to 40 percent by weight of the silica filler, and further containing 1.5 percent by weight of 2,4-dichlorobenzoyl peroxide, was cast under a doctor blade onto a continuous strip of aluminum foil moving at the rate of 1 to 2 feet per minute. The film was then heated to a temperature of 100° C to evaporate the solvent from the film and partially cure the film. A 15 percent dispersion in toluene of silicone rubber containing 25 percent by weight of acetylene carbon black filler, and further containing 3.5 percent by weight of benzoyl peroxide, was then cast by a second doctor blade on top of the partially cured film of silica-filled silicone rubber, while simultaneously feeding a reinforcing polyester knit fabric underneath such second doctor blade so as to become embedded within the carbon black-filled silicone rubber layer. Immediately thereafter, a 15 percent dispersion in toluene of commercial silica-filled silicone rubber stock containing 25 to 40 percent by weight of the silica filler, and further containing 1.5 percent by weight of 2,4-dichlorobenzoyl peroxide, was cast by a third doctor blade on top of the carbon black-filled silicone rubber layer. The membrane was then heated to a temperature of 70° C to evaporate solvent therefrom, after which the entire membrane was fully cured by heating to a curing temperature of 180° C. The membrane was thereafter post-cured with ultraviolet light.

The resulting three-layer laminated silicone rubber membrane had the configuration as shown in FIG. 2. The membrane had a total thickness of 50 microns, with the uppermost layer of silica-filled silicone rubber having a thickness of 10 microns and each of the other two layers having a thickness of 20 microns.

EXAMPLE 3

The procedure of Example 2 was repeated, but substituting for the 15 percent silica-filled silicone rubber dispersion used for forming the third layer, a 15 percent dispersion in toluene of filler-free silicone rubber containing 1.5 percent by weight of benzoyl peroxide.

The resulting three-layer laminated silicone rubber membrane had the configuration as shown in FIG. 3. The membrane had a total thickness of 50 microns, with the silica-free silicone rubber layer having a thickness of 10 microns and each of the other two layers having a thickness of 20 microns.

EXAMPLE 4

The membranes fabricated in accordance with Examples 1 and 2 were utilized as the blood gas exchange membrane in 0.6m² spiral coil membrane lungs. In the case of the two-layer membrane of Example 1, the carbon black-filled silicone rubber layer was used as the blood-contacting surface. In the case of the three-layer membrane of Example 2, the silica-filled silicone rubber layer constituting the third layer cast during fabrication of the membrane, was used the blood-contacting surface. Awake lambs underwent arteriovenous perfusion through these spiral coil membrane lungs. The membranes were primed with heparinized Lactated Ringer's. The animals were fully heparinized at the start of perfusion, but received no maintenance heparin treatment after perfusion had begun. Arterial blood samples were drawn at 1, 3, 5, 7, 10, 15 and 30 minutes and hourly. With both types of membranes, the perfusions proceeded without any decrease in white blood cells or change in white blood cell differential compared to baseline values, indicating the absence of leukopenia and granulocytopenia. Moreover, the perfusions proceeded without any clot formation within the membrane lung, and the animals tolerated the perfusions in good health.

EXAMPLE 5

The membrane fabricated in accordance with Example 3 was utilized as the blood gas exchange membrane in 0.6m² spiral coil membrane lungs, with the filler-free silicone rubber layer of the membrane being used as the blood-contacting surface. Awake lambs underwent arteriovenous perfusion through such spiral coil membrane lungs. The membranes were primed with heparinized Lactated Ringer's. The animals were fully heparinized at the start of perfusion, but received no maintenance heparin treatment after perfusion had begun. Arterial blood was sampled at 1, 3, 5, 7, 10, 15 and 30 minutes, hourly for six hours, and daily thereafter. The perfusions were electively terminated at 2, 7, 8 and 12 days. All of the perfusions proceeded without any clot formation within the membrane lungs, and all the animals tolerated the perfusions in good health. None of the perfusions exhibited any decrease in blood platelet count at initiation of perfusion. In all the perfusions, resistance to blood flow remained unchanged, and blood platelet counts at termination were 80 percent of baseline values.

The embodiments of the invention in which an exclusive property or privilege is claimed are defined as follows:

1. In a membrane artificial lung device for extracorporeal blood gas exchange during blood perfusion therethrough including a blood-compatible gas-permeable membrane through which said exchange is effected, the improvement consisting of said membrane being a laminated silicone rubber membrane composed of at least two layers comprising a first layer of silicone rubber compounded with from about 25 to about 40% by weight of silica filler and a second layer of silicone rubber compounded with from about 0.25 to about 40% by weight of carbon black filler.

2. The membrane artificial lung device of claim 1, wherein said silicone rubber is polydimethylsiloxane.

3. The membrane artificial lung device of claim 1, wherein said carbon black is acetylene carbon black.

4. The membrane artificial lung device of claim 3, wherein said second layer of silicone rubber contains about 25% by weight of said acetylene carbon black.

5. The membrane artificial lung device of claim 1, wherein said second layer of silicone rubber contains from about 15 to about 30% by weight of said carbon black filler.

6. The membrane artificial lung device of claim 1, further including a gas-permeable reinforcing material selected from the group consisting of fabric and microporous polymeric film embedded within said membrane.

7. The membrane artificial lung device of claim 6, wherein said reinforcing material is embedded within said second layer.

8. The membrane artificial lung device of claim 1, wherein said membrane has a total thickness of from about 20 to about 250 microns.

9. The membrane artificial lung device of claim 8, wherein said first layer has a thickness of from about 5 to about 100 microns, and each additional layer has a thickness of from about 1 to about 100 microns.

10. The membrane artificial lung device of claim 1, wherein said membrane is composed of said first layer and said second layer, and is disposed within said device so that the blood-contacting surface thereof during blood perfusion through said device is said second layer.

11. The membrane artificial lung device of claim 10, wherein said membrane has a total thickness of about 50 microns and is composed of said first layer having a thickness of about 25 microns and said second layer having a thickness of about 25 microns.

12. The membrane artificial lung device of claim 11, wherein said membrane is composed of three layers wherein said second layer is sandwiched between said first layer and a third layer of silicone rubber compounded with from about 25 to about 40% by weight of silica filler, and said membrane is disposed within said device so that the blood-contacting surface thereof during blood perfusion through said device is said third layer.

13. The membrane artificial lung device 12, wherein said first layer has a thickness of about 20 microns, said second layer has a thickness of about 20 microns, and said third layer has a thickness of about 10 microns.

14. The membrane artificial lung device of claim 1, wherein said membrane is composed of three layers wherein said second layer is sandwiched between said first layer and a third layer of filler-free silicone rubber, and said membrane is disposed within said device so that the blood-contacting surface thereof during blood perfusion through said device is said third layer.

15. The membrane artificial lung device of claim 14, wherein said first layer has a thickness of about 20 microns, said second layer has a thickness of about 20 microns, and said third layer has a thickness of about 10 microns.

16. In a method for extracorporeal blood gas exchange by blood perfusion through a membrane artificial lung device including a blood-compatible gas-permeable membrane through which said exchange is effected, the improvement consisting of using as said membrane a laminated silicone rubber membrane composed of at least two layers comprising a first layer of silicone rubber compounded with from about 25 to about 40% by weight of silica filler and a second layer of silicone rubber compounded with from about 0.25 to about 40% by weight of carbon black filler, whereby thrombosis within said device is eliminated without the necessity of maintenance anticoagulant treatment during said perfusion.

17. The method of claim 16, wherein said membrane is composed of said first layer and said second layer, and said perfusion is carried out with the blood in contact with said second layer, whereby leukopenia and granulocytopenia during said perfusion are eliminated.

18. The method of claim 16, wherein said membrane is composed of three layers wherein said second layer is sandwiched between said first layer and a third layer of silicone rubber compounded with from about 25 to about 40% by weight of silica filler, and said perfusion is carried out with the blood in contact with said third layer, whereby leukopenia and granulocytopenia during said perfusion are eliminated.

19. The method of claim 16, wherein said membrane is composed of three layers wherein said second layer is sandwiched between said first layer and a third layer of filler-free silicone rubber, and said perfusion is carried out with the blood in contact with said third layer, whereby decrease in blood platelet count during said perfusion is inhibited.

* * * * *